United States Patent
Mack

(10) Patent No.: US 6,988,406 B1
(45) Date of Patent: Jan. 24, 2006

(54) SYSTEM AND METHOD OF LIQUID LEVEL DETECTION

(76) Inventor: Robert Mack, P.O. Box 6471, Lake Charles, LA (US) 70606-6471

( * ) Notice: Subject to any disclaimer, the term of this patent is extended or adjusted under 35 U.S.C. 154(b) by 0 days.

(21) Appl. No.: 10/972,266

(22) Filed: Oct. 25, 2004

(51) Int. Cl.
*G01F 23/36* (2006.01)
*G01F 23/52* (2006.01)
*G01F 23/60* (2006.01)

(52) U.S. Cl. .......................... 73/313; 73/305; 73/313; 73/319; 73/323

(58) Field of Classification Search ............... 73/313, 73/305, 323, 319
See application file for complete search history.

(56) References Cited

U.S. PATENT DOCUMENTS

| | | | |
|---|---|---|---|
| 3,942,379 A | 3/1976 | Kanzler | |
| 3,956,934 A | 5/1976 | White | |
| 4,048,856 A | 9/1977 | Conrad | |
| 4,155,013 A | 5/1979 | Spiteri | |
| 4,213,338 A | 7/1980 | Hardy | |
| 4,352,248 A * | 10/1982 | Kobayashi | 34/88 |
| 4,729,236 A * | 3/1988 | Samborsky | 73/1.25 |
| 4,997,013 A | 3/1991 | Peckels | |
| 5,103,674 A | 4/1992 | Outwater et al. | |
| 5,337,779 A * | 8/1994 | Fukuhara | 137/187 |
| 5,357,781 A * | 10/1994 | Tikijian | 73/19.1 |
| 5,367,907 A | 11/1994 | Elfverson | |
| 5,900,546 A | 5/1999 | Wilkins | |
| 5,986,449 A * | 11/1999 | Koski | 324/207.13 |
| 6,067,854 A * | 5/2000 | Yang | 73/305 |
| 6,435,026 B1 | 8/2002 | Donehue | |

* cited by examiner

*Primary Examiner*—Hezron Williams
*Assistant Examiner*—André K. Jackson
(74) *Attorney, Agent, or Firm*—Egbert Law Offices

(57) ABSTRACT

A system of liquid level detection has a vessel, a sight glass in fluid communication with the vessel, a float positioned in the sight glass, a proximity switch affixed exterior of the sight glass for transmitting a signal relative to a sensing of the float in proximity to the proximity switch, a timer cooperative with the proximity switch for measuring a period of time relative to the signal from the proximity switch, and an indicator cooperative with the timer for producing a humanly perceivable indication when the period of time is at a predetermined limit. The proximity switch can be positioned so as to detect a low level of liquid in the vessel or a high level of liquid in the vessel.

6 Claims, 4 Drawing Sheets

SYSTEM AND METHOD OF LIQUID LEVEL DETECTION

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to devices for detecting the level of liquid in a vessel. More particularly, the present invention relates to devices that utilize a sight glass for determining a level of liquid. Additionally, the present invention relates to electronic devices for the detecting of upper and/or lower limits of a turbulent liquid in a vessel.

BACKGROUND OF THE INVENTION

There are many instances where it is important that the level of liquid be known with relative accuracy. Thus, the level of lakes, rivers and reservoirs must often be known so that various water control programs can be operated effectively, such as for flood control, irrigation and hydroelectric power generation. It is also important to know the water level in water storage towers as well as the liquid level tanks used for storing oil and other organic liquids, such as gasoline, kerosine, alcohol, chlorine and the like. Turbulent liquids, or liquids with low boiling temperatures, such as liquified natural gas, cause particular gauging problems because of their unsteady surface.

One way in which the liquid level is presently determined is by the use of a float on the liquid. The float is connected to a measuring wire or tape which is then fed to a suitable gauge head where the height of the liquid level is read off directly by observing markings on the tape or wire. Such a measuring system provides an accurate reading for a liquid level only when the liquid level is free of waves or turbulent conditions. This is true even in those instances where vertical movement of the float is guided by wires or rods which extend upright into and above the liquid level to thus prevent the float from being displaced laterally by wave, wind or turbulent action.

Other devices are sometimes used in place of a float to determine the location of the liquid level. Some of these devices are temperature sensors, thermal and electrical conductivity devices, and liquid displacers. All such devices, however, require elimination of wave action against the device to obtain an accurate indication of the liquid level.

To prevent wave action from interfering with a liquid level indicating device, it has been common to put the device in a large diameter vertical pipe which communicates with the liquid and which extends from an anticipated low liquid level to a high liquid level. The pipe provides a stilling chamber containing the liquid in which the liquid level indicating device is essentially unaffected by wave or turbulent action.

The sight glass is a vertically extending tube preferably of a transparent material, such as glass provided with suitable gradations. The lower end of the tube is connected in communication with the liquid in the container so that the liquid level in the tube and the container will remain the same when the pressure, which may be atmospheric pressure, on the surface of the liquid and tube is the same. In such an arrangement, as liquid is removed from the container, the level of liquid in the tube follows the liquid level in the container thereby providing a continuous indication of the quantity of the liquid in the container. In certain circumstances, it is desirable to connect an alarm, or light, or other indicators to the sight glass so as to provide a remote means of determining when the liquid in the container has reached a high level or a low level condition. In certain circumstances, when the level of the liquid within the container is too high, it is important to be able to release liquid from the container so that an explosive condition is avoided. In other circumstances, when the low level is detected, it is important to add liquid to the container so as to avoid a "dry pumping" condition. In other circumstances, the use of the potentially empty container can result in an interruption in certain processes until additional liquid is added to the container.

Unfortunately, the use of a sight glass is often difficult where the liquid in the container has wave action or experiences turbulent conditions. As a result, the liquid in the sight glass will often bounce upwardly and downwardly. Any proximity switch that are used in association with the sight glass will experience a "bouncing" of the float therein. As a result, the alarm light or sound will become very intermittent as the float is in near proximity to the proximity switch. The bounce will cause the light to flicker on-and-off or the audible alarm to sound on-and-off. This often produces and erroneous indication to the person carrying out the monitoring. It is very difficult to know when the low level condition is actually achieved when the monitoring light is flickering on-and-off. As such, a need has developed so as to provide a positive indication when a low level or upper level condition has been reached.

In the past, various U.S. patents have issued relating to the detection of liquid levels in a container. For example, U.S. Pat. No. 3,942,379, issued on Mar. 9, 1976 to A. A. Kanzler, describes a floating wave stilling chamber for liquid level indicators. This device utilizes a gage mechanism that comprises a measuring means joined to a liquid level indicating device, and a floating stilling chamber circumscribing the periphery of the liquid level indicating device. The stilling chamber has a wall extending above the action of the wave action of the liquid. A vertical guide controls the lateral movement of the chamber at all levels in which the liquid level is to be measured.

U.S. Pat. No. 3,956,934, issued on May 18, 1976 to J. M. White, teaches a liquid level indicator for a pressurized liquid container. This indicator utilizes a gauge tube of transparent material having a check valve therein. The upper end of the gauge tube and the container communicating with the associated source of pressurized gas will normally maintain the check valve in the closed condition. The lower end of the gauge tube communicates with the dispensing conduit to thereby establish liquid communication between the container and the gauge tube so that the level of liquid in the gauge tube continuously corresponds to the level of liquid in the container while the check valve in the gauge tube maintains the liquid in the gauge tube during the dispensing of the liquid.

U.S. Pat. No. 4,048,856, issued on Sep. 20, 1977 to D. W. Conrad, describes a quick shut-off device with a direct reading liquid level indicator. This device attaches to the side of a liquid-filled container to measure the amount of liquid therein. Upper and lower valves have a sight glass extending therebetween. These valves are provided with ball valves to allow the on-off positions of the valves to be controlled by a 90° change in position of rods connected to the ball valves.

U.S. Pat. No. 4,155,013, issued on May 15, 1979 to J. Spiteri, teaches a liquid level indicator that utilizes the difference between the refraction of light by a prism in contact with air and by the same prism in contact with liquid being monitored so as to give a warning of low liquid level. Light is transmitted to a prism by an incoming fiberoptic lead and returned from the prism by a return fiberoptic lead.

U.S. Pat. No. 4,213,338, issued on Jul. 22, 1980 to A. L Hardy, also describes a liquid level indicator which provides a visual indication of the level within a rinse aid dispenser tank for dishwashers. This has a U-shaped tube containing an indicator liquid having one leg in communication with the lowermost region of the tank and with the other end disposed adjacent a viewing window. Air pressure generated in the connecting tubing by the relative liquid level in the tanks acts to control the position of the liquid in the U-shaped tube to provide a level indication at the viewing window.

U.S. Pat. No. 4,997,013, issued on Mar. 5, 1991 to A. E. Peckels, provides a liquid fill level indicator which has a non-electric fill indicator having an air passageway leading up and out of the vessel to an air flow indicator. The air escaping during filling causes the indicator to whistle. When the whistle stops, the vessel is filled and the user stops filling.

U.S. Pat. No. 5,103,674, issued on Apr. 14, 1992 to Outwater et al., describes a liquid level indicator for high-pressure, hostile environments. In particular, the hostile environment is a closed container of a nuclear reactor. This method provides a generally tubular structure connected to the closed container of the nuclear reactor so that the level of liquid in the tubular structure is indicative of the level of liquid in the closed container. A sealed buoyant float is sized to move vertically upwardly and downwardly within the tubular structure. The float is formed of beryllium. The location of float is detecting from outside the tubular structure. The vertical position of float corresponds to the level of liquid in the closed container.

U.S. Pat. No. 5,367,907, issued on Nov. 19, 1994 to S. Elfberson, also teach a liquid level indicator that comprises a rod of insulating material. The rod is a carrier for two parallel helically wound resistance wires and is surrounded by a float of insulating material displaceable along the rod by variations in the liquid level.

U.S. Pat. No. 5,900,546, issued on May 4, 1999 to L. C. Wilkins, describes a liquid level indicator for storage tanks. A float is slidable along the tube. The float is magnetically coupled to an ultrasound reflector piston inside the tube so that, when the tube is in the liquid in the tank, the float determines the height of the piston inside the tube. An ultrasonic transducer atop the tube sends pulses down the tube and which are reflected by the piston to the transducer. A computer coupled to the transducer determines and displays the liquid level.

U.S. Pat. No. 6,435,026, issued on Oct. 20, 2002 to W. L. Donehue, also provides a liquid level indicator. In this device, a magnetized float moves as the level of liquid changes. The indicator has a plurality of magnetized indicator elements disposed one above the other and past which the magnetized float travels as the liquid level rises or falls.

It is an object of the present invention to provide a liquid level indicator which provides a notice of when the level of liquid within a vessel has reached a low level or has reached a high level.

It is another object of the present invention to provide a system in which accounts for turbulent or wave action within the vessel.

It is a further object of the present invention to provide a system for a liquid level indication which effectively avoids false indications of low levels or high levels of the liquid within the vessel.

It is a further object of the present invention to provide a liquid level indicator system in which the sight glass will accommodate pressure releases.

It is a further object of the present invention to provide a liquid level indicator system which avoids problems associated with the "bounce" of the float.

It is still a further object of the present invention to provide a liquid level indicator system which easy to manufacture, relatively inexpensive, and easy to implement.

These and other objects and advantages of the present invention will become apparent from a reading of the attached specification and appended claims.

BRIEF SUMMARY OF THE INVENTION

The present invention is a system of liquid level detection that comprises a vessel, a sight glass in fluid communication with the vessel, a float positioned in the sight glass, a proximity switch means affixed exterior of the sight glass, a timer cooperative with the proximity switch means, and an indicator cooperative with the timer means for producing a humanly perceivable indication when the period of time reaches a predetermined limit. The sight glass is in fluid communication with the vessel and extends in a generally vertical orientation. The float is movable within the sight glass relative to the level of liquid within the sight glass. The proximity switch serves to transmit a signal relative to a sensing of the float in proximity to the proximity switch means. The timer means serves to measure a period relative to the signal from the proximity switch means.

In the present invention, the sight glass has a generally horizontal portion connected adjacent a bottom of the vessel. The sight glass has a generally 90° bend extending between the generally vertical orientation to the horizontal portion. In the preferred embodiment of the present invention, the sight glass is transparent.

The float is a cylindrical member formed of a metallic material. The proximity switch means serves to produce the signal upon the sensing of the metallic material. In the preferred embodiment of the present invention, the liquid in the vessel and in the sight glass is corrosive liquid. In the preferred embodiment of the present invention, the float is formed of a titanium material which is suitable for floating on the surface of the corrosive liquid.

The proximity switch means of the present invention comprises a proximity switch having a sensor positioned adjacent an exterior surface of the sight glass and collar adjustably affixed around the sight glass. A proximity switch is supported in a desired position by the collar. In particular, in the preferred embodiment of the present invention, a first proximity switch is affixed to a first location along the sight glass. A second proximity switch is affixed to a second location along the sight glass. The first proximity switch is a low level switch. The second proximity switch is a high level proximity switch.

In the present invention, a liquid fills at least a portion of the vessel. The liquid also fills at least a portion of the sight glass such that the level of liquid in the vessel is identical to the level of liquid in the sight glass. The float will float in the liquid in the sight glass adjacent to the top of the level of liquid in the sight glass.

The timer means serves to produce the period of time when the proximity switch is not sensing the float. The indicator means serves to produce an alarm when the period of time exceeds the predetermined limit. Alternatively, the timer means will measure the period of time when the proximity switch means senses the float. In this embodiment, the indicator means serves to produce an alarm when the period of time exceeds a predetermined limit.

The present invention provides a fluid release fitting affixed to the upper end of the sight glass. This fluid release fitting allows fluid to escape therethrough. The fluid release fitting includes a cruciform member having a tubular bottom end affixed onto the upper end of the sight glass. The cruciform member also has a upper tubular portion having a length suitable for receiving the float therein. The cruciform member has a pair of opposed tubular gas outlets extending transversely to the bottom end and to the upper portion.

The present invention is also a method of measuring the level of liquid that comprises the steps of: (1) connecting a sight glass to a liquid-containing vessel such that the sight glass extends in a generally vertical orientation and has a level of liquid therein generally matching the level of liquid in the vessel; (2) placing a float in the liquid in the sight glass such that the float moves vertically in the sight glass relative to the level of liquid therein; (3) sensing a position of the float in the sight glass; (4) transmitting a signal relative to the sensing of the position of the float in the sight glass; (5) timing a period of time that the signal is transmitted; and (6) producing a humanly perceivable indication when the period of time is at a predetermined limit.

In one embodiment of the present invention, the step of timing includes continuously resetting the initiation of the period of time as the position of the float is sensed. The period of time will be the period of time in which the float is not sensed. Alternatively, the step of timing comprises initiating the period of time which the float is sensed. The period of time is the period of time during which the float is sensed.

The method of the present invention also includes the steps of: (1) affixing a proximity switch to an exterior of the sight glass; and (2) positioning the proximity switch such that the proximity switch is located a distance above a low level of the liquid in the sight glass generally equal to the length dimension of the float. The proximity switch can also be affixed to an exterior of the sight glass generally adjacent a high level of liquid in the sight glass. This proximity switch will sense the position of the float.

DETAILED DESCRIPTION OF THE INVENTION

Figure 1:
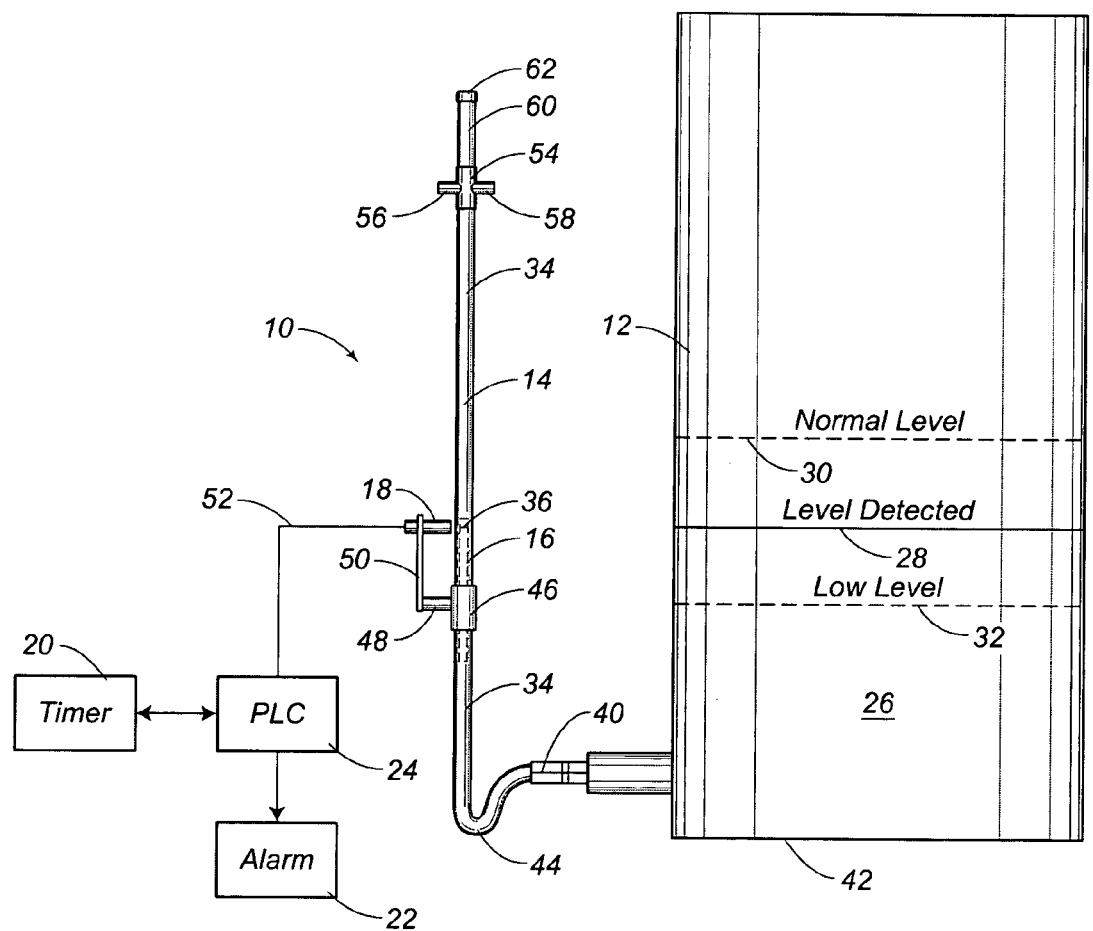
FIG. 1 is a diagrammatic illustration of the liquid level indicating system in accordance with a simple form of the present invention.

Referring to FIG. 1, there is shown the system 10 of liquid level detection. The system 10 includes a vessel 12, a sight glass 14, a float 16, a proximity switch 18, a timer 20, and indicator 22. The sight glass 14 extends in a generally vertical orientation in generally parallel relationship to the vessel 12. The float 16 is movable in the sight glass relative to the level of liquid within the vessel 12 and the level of liquid within the sight glass 14. The proximity switch 18 is affixed to an exterior of the sight glass 14. The proximity switch 18 will transmit a signal to a programmable logic controller 24 relative to a sensing of the float 16 in proximity to the proximity switch 18. The timer 20 is cooperative with the proximity switch 18 by way of the programmable logic controller 24. The timer 20 will measure a period of time relative to the signal from the proximity switch 18. The indicator 22 is also interactive with programmable logic controller 24, the timer 20 and the proximity switch 18. The indicator 22 can be an alarm which produces a humanly perceivable indication of when the period of time is at a predetermined limit. The indicator 22 can be in the nature of a light bulb or LED that is illuminated or an audible alarm.

In FIG. 1, it can be seen that the vessel 12 is an unpressurized vessel having a liquid 26 therein. Liquid 26 will have a level 28 of liquid therein. As illustrated in FIG. 1, the liquid 26 can have a normal level of liquid 30 (indicated in broken line fashion) and a low level of liquid 32 (also indicated in broken line fashion). Similarly, the sight glass 14 will also include a liquid 34 therein. Liquid 34 will have a level 36 generally matching the liquid 28 of liquid in the vessel 12.

The sight glass 14 is a glass tube formed of a transparent material. The sight glass 14 includes a vertical portion 38 and a horizontal portion 40. The horizontal portion is connected by suitable connectors to the vessel 12 generally adjacent to the bottom 42 of the vessel 12. Importantly, the sight glass 14 will include a 90° bend 44 positioned between the vertical portion 38 and the horizontal portion 40. The 90° bend 44 will extend downwardly below the level of the horizontal portion 40. It is important that the bend 44 be included in the sight glass 14 so as to continuously maintain a level of liquid in the area of the bend 44. As a result, the liquid will prevent any accidental release of liquid therefrom from causing the float 16 to drop and damage the bottom of the sight glass 14. As with conventional sight glasses, the level 36 of liquid 34 in the sight glass 14 will match the level 28 of liquid within the vessel 12. In the preferred embodiment of the present invention, the vessel 12 will contain a corrosive liquid therein. The float 16 will be formed of a titanum material so as to avoid corrosion or other problems with the interaction with the corrosive liquid.

The float 16 is a metallic cylindrical float having an outer diameter which is less than the inner diameter of the sight glass 14. The float 16 has a buoyancy only slightly more than the liquid it displaces. As such, the upper end of the float 16 will reside slightly above the level 36 of the liquid 34 within the sight glass 14.

The proximity switch 18 is positioned on the exterior of the sight glass 14. In particular, a collar 46 is adjustably affixed around the exterior of the sight glass 14. The collar 14 has an element 48 extending therefrom. An arm 50 is affixed to the element 48 and extends upwardly therefrom. The proximity switch 18 is received by the arm 50 and supported in a desired position adjacent to the exterior of the sight glass 14. The proximity switch 18 should be of a type suitable for sensing the presence of the metallic material of the float 16 adjacent thereto. As the level of liquid 34 within the sight glass 14 should drop, the float 16 will move out of proximity with the proximity switch 18.

The proximity switch 18 is interconnected by line 52 to the programmable logic controller 24. Similarly, the timer 20 and the indicator 22 are also interconnected to the programmable logic controller 24.

The introduction of the metallic cylindrical float 16 into the sight glass 14 facilitates the method of the detecting the liquid level in the vessel 12. The float 16 has a buoyancy only slightly greater than the liquid 34 that it displaces. The proximity switch 18 produces a contact closure upon the detecting of the presence of metal. The proximity switch 18 is attached to the exterior of the sight glass 14 at the level at which a discrete status change is desired. For example, if it is desired to know when the level of the turbulent liquid has decreased by four inches, the float 16 should be made four inches long and the proximity switch 18 should be located four inches below the normal level 30. A low level is indicated by a contact opening.

Since the level 36 in the sight glass 14 is dynamic, the float 16 will bounce. When the float 16 is near the proximity switch 18, the bouncing float 16 will cause rapid changes of the contact status. To confirm that the level has changed, the status of the proximity switch 18 must remain closed for a discrete number of minutes. A timer function from timer 20 is used in the programmable logic controller 24. The timer function is controlled by two inputs; a "start" input and a "reset" input. The "start" input is always set "ON". The status of the proximity switch 18 is connected to a "reset" input of the timer function. If the proximity switch 18 does not detect the presence of the float, its contact will not close, the timer will not reset, the timer will increment to the assigned or desired limit, and the discrete status indicator 22 of the "low limit" is turned "ON".

As can be seen in FIG. 1, a fluid release fitting 54 is affixed to the upper end of the sight glass 14. The fluid release fitting 54 includes a pair of fluid outlets 56 and 58 and an upper tubular float receiving receptacle 60. The fluid release fitting 54 provides a means to prevent the float 16 from the being blown out the sight glass, yet not restrict the pressure release point of the sight glass. The fitting 54 is in the nature of the a pipe cross positioned at the top of the sight glass 14. The tubular fluid outlets 56 and 58 are openable to the atmosphere. The upper tubular position 60 has a length equal to the length of the float and is connected to the top of the cruciform-shaped fluid fitting 54. A cap 62 is connected to the top of the pipe. The effect of the combination of the cruciform-shaped fluid fitting 54, the tubular upper portion 60, and the cap 62 enables the float 16 to be caught on an over-pressure condition but still allows the pressure in the vessel 12 to be released to the atmosphere. After pressure is released, the float 16 can drop to its original position.

Figure 2:
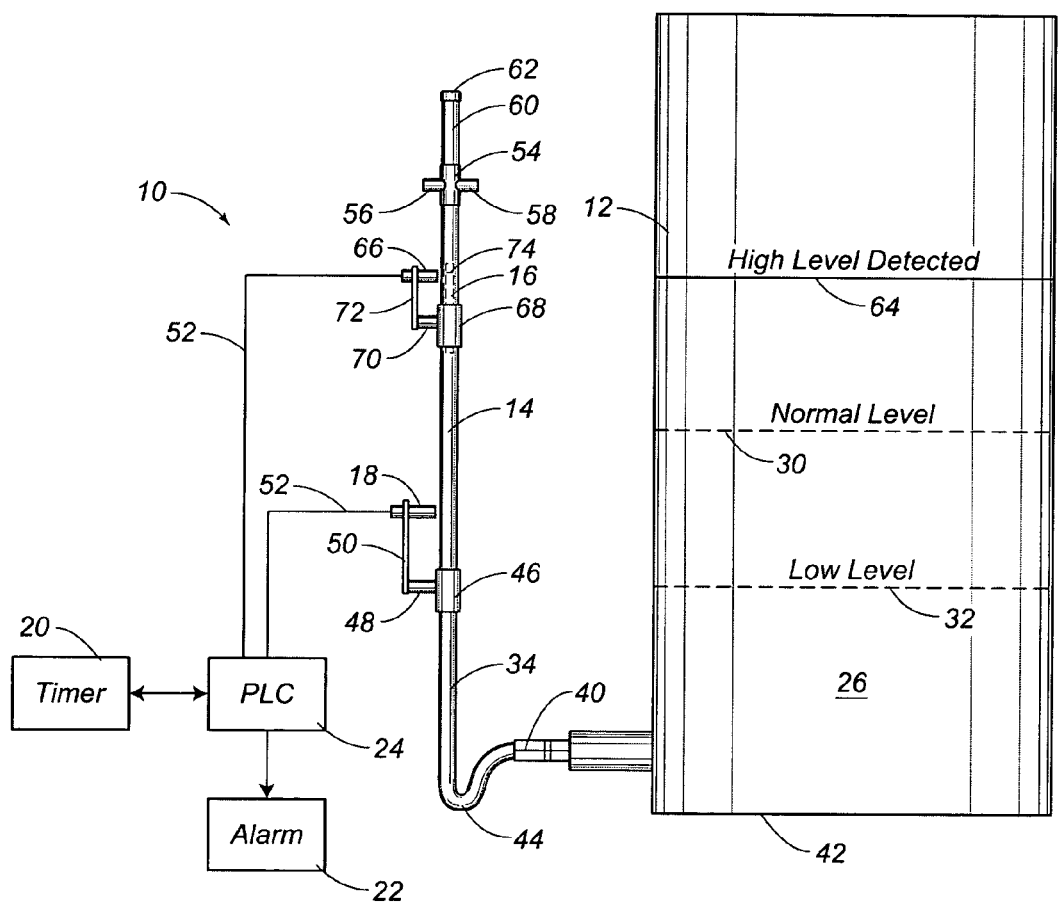
FIG. 2 is a diagrammatic illustration of the liquid level indication system of the present invention of the preferred embodiment of the present invention.

FIG. 2 shows an alternative form of the present invention. In FIG. 2, it can be seen that the vessel 12 has a high level of liquid 64 therein. The normal level of liquid 30 and the low level liquid 32 are indicated in broken line fashion. In FIG. 2, the sight glass 14 is similarly connected to the area adjacent to the bottom 42 of the vessel 12. In FIG. 2, the proximity switch 18 is positioned in the same position as illustrated in FIG. 1. The proximity switch 18 is connected by line 52 to the programmable logic controller 24, the timer 20, and the alarm 22. The fluid release fitting 54 is secured to the upper end of the sight glass 14.

In FIG. 2, it is important to note that an upper proximity switch 66 is affixed generally adjacent to the upper end to the sight glass 14. The proximity switch 66 is supported by a collar 68 secured around the exterior surface of the sight glass 14. An element 70 extends outwardly from one side of the collar 68 so as to support an arm 72 extending upwardly to the proximity switch 66. The float 16 is illustrated in an upper position supported by the level 74 of the liquid 34 within the sight glass 14. The proximity switch 66 is connected by line 76 to the programmable logic controller 24. The arrangement of the proximity switches 18 and 66 are designed so as to provide a low level indication and a high level indication to the indicator 22. Both of the proximity switches 18 and 66 are connected to the programmable logic controller 24. Within the logic of the programmable logic controller 24, the status of the upper proximity switch 66 is inverted such that a contact open status becomes a contact closure. The status of the lower proximity switch 18 is not changed. The inverted status of the upper proximity switch 66 is connected to the "reset" input of the timer 20. If the upper proximity switch 66 detects the presence of the float 16, its inverted contact will not "close", the timer will not "reset", and the timer will increment to the assigned limit. As a result, the discrete status indicator 22 of "upper" limit will be turned "ON".

Figure 3:
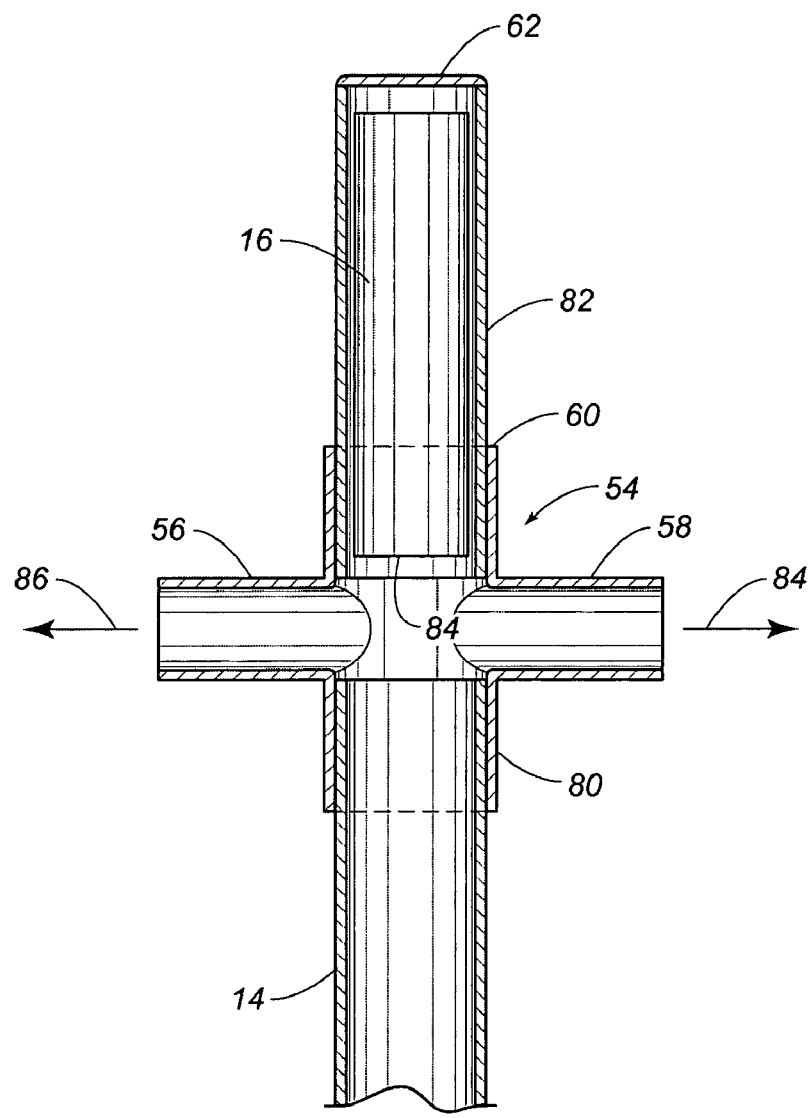
FIG. 3 is a cross-sectional view showing the placement of the gas release fitting onto the sight glass.

FIG. 3 is a detailed illustration of the fluid release fitting 54 as used in the present invention. As can be seen, the fluid release fitting is secured to the upper end of the sight glass 14. In particular, the fluid release fitting 54 is a cruciform member having a tubular bottom end 80 which is affixed around the top end of the sight glass 14. The fluid fitting 54 has an upper portion 54 that is secured around a tubular receptacle 82. The tubular receptacle 82 has cap 62 affixed thereto. The tubular receptacle 82 should having a suitable length and diameter to accommodate the metallic cylindrical float 16 therein. The bottom end 84 of the float 16 should be sufficiently elevated so as to avoid blocking the pair of opposed tubular fluid outlets 56 and 58. In the configuration shown in FIG. 3, the fluid outlets 56 and 58 communicate with the interior of the sight glass 14. As such, if pressure release is necessary through the interior of the sight glass 14, such fluid will be released outwardly (in the direction of arrows 84 and 86) from the sight glass 14. After the fluid is released, the float 16 will be free to drop back down through interior of the fluid release fitting 54 back into the interior of the sight glass 14.

Figure 4:
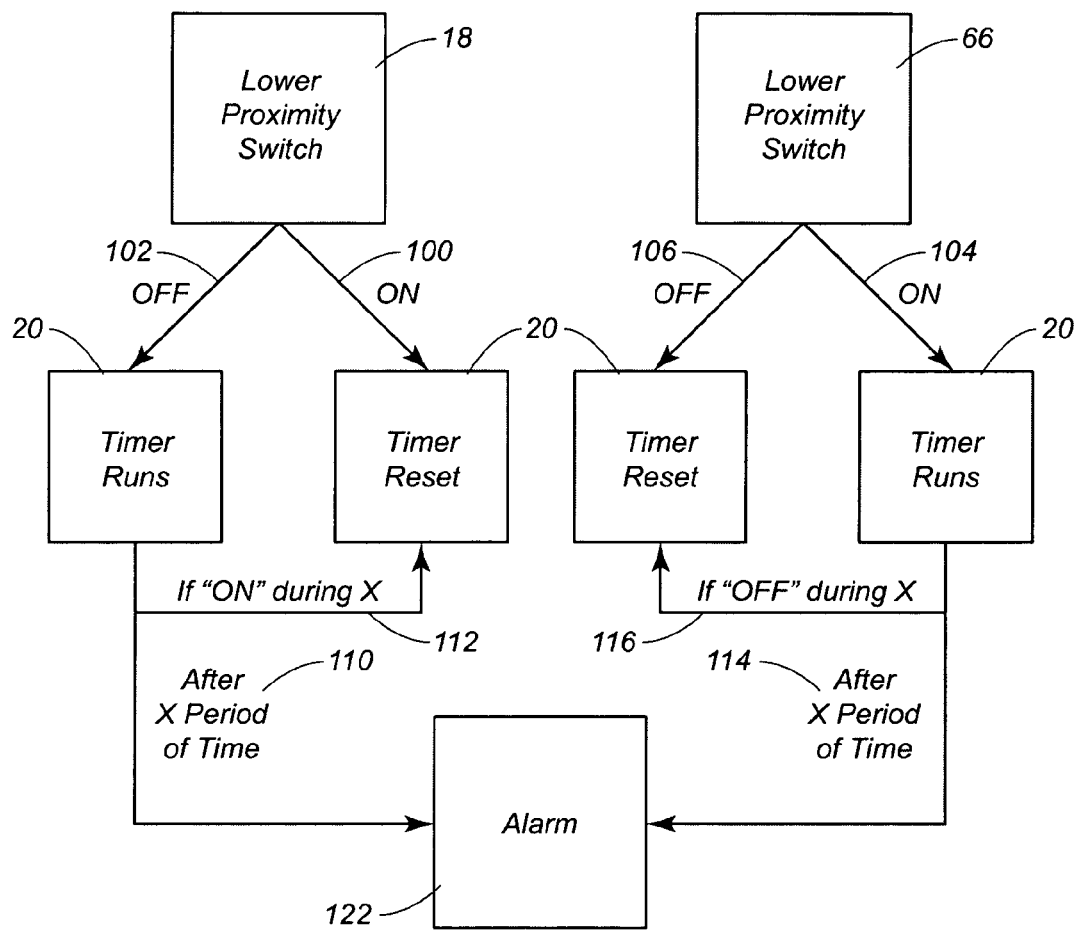
FIG. 4 is a block diagram showing the processing of information by the proximity switches.

FIG. 4 is a diagrammatic illustration of the electronic and the logic operation of the system 10 of the present invention. As can be seen, the lower proximity switch 18 has an "on" condition 100 and an "off" position 102. Similarly, the upper proximity switch 66 has an "on" condition 104 and an "off" position 106. When the lower proximity switch 18 senses the presence of the float 16, the lower proximity switch 18 will be in its "on" condition. This causes the timer 20 to be reset. When the float 16 is out-of-range of the lower proximity switch 18, the "off" condition 102 will occur. As a result, the timer 20 will run. As long as the lower proximity switch 18 is in its "off" condition 102, the timer 20 will continue to run. After a desired period of time 110 has occurred, a signal will be transmitted to the alarm 122 so as to provide a visual or audible indication that the lower level of the vessel 12 has been reached. If the lower proximity switch 18 should sense the float 16 during the period of time 110, the timer 20 will be reset as shown by path 112. As a result, "bounces" in the float 16 and turbulence in the liquid 26 are accommodated. In other words, the alarm 122 will not illuminate or sound for every "bounce" of the float.

The upper proximity switch 66 operates in an inverted manner. When the upper proximity switch 66 senses the float 16 and produces an "on" condition 104, the timer 20 will run. When the float is a distance from its upper limit, the upper proximity switch 66 will not sense the float and will maintain the "on" condition 106. This causes the timer 20 to continuously reset. If the timer 20 should run from a desired period of time 114, then a signal will be produced which is transmitted to activate the alarm 122. However, if a "bounce" should occur during the desired period of time, the timer 20 will be reset as illustrated in the manner of pathway 116. As a result, the upper proximity switch will only sound the alarm 122 or illuminate the alarm 122 when the float is maintained in an upper level position for the desired period of time. As a result, mere "bounces" of the float adjacent to or near the upper limit will not cause the alarm 122 to sound or illuminate.

The foregoing disclosure and description of the invention is illustrative and explanatory thereof. Various changes in the details of the illustrated construction or in the steps of the described method may be made within the scope of the appended claims without departing from the true spirit of the invention. The present invention should only be limited by the following claims and their legal equivalents.

I claim:

1. A system of liquid level detection comprising:
a vessel;
a sight glass in fluid communication with said vessel, said sight glass extending in a generally vertical orientation;
a float positioned in said sight glass, said float movable in said sight glass;
a proximity switch means affixed to an exterior of said sight glass, said proximity switch means for transmitting a signal relative to a sensing of the float proximity to said proximity switch means;
a timer means cooperative with said proximity switch means, said timer means for measuring a period of time relative to said signal from said proximity switch means;
an indicator means cooperative with said timer means for producing a humanly perceivable indication when said period of time is at a predetermined limit, said timer means for measuring said period of time when said proximity switch means senses said float, said indicator means for producing an alarm when said period of time exceeds said predetermined limit; and
a fluid release fitting affixed to an upper end of said sight glass, said fluid release fitting allowing fluid to escape therethrough, said fluid release fitting comprising a cruciform member having a tubular bottom end affixed on to said upper end of said sight glass, said cruciform member having an upper tubular portion having a length suitable for securing said float therein, said cruciform member having a pair of opposed tubular fluid outlet extending transversely to said bottom end and to said upper tubular portion.

2. A method of measuring a level of liquid comprising:
connecting a sight glass to a liquid-containing vessel such that said sight glass extends in a generally vertical orientation, said sight glass having a level of liquid therein generally matching a level of liquid in said vessel;
placing a float in the liquid in said sight glass such that said float moves vertically in said sight glass relative to the level of liquid therein;
sensing a position of said float in said sight glass;
transmitting a signal relative to the sensing of the position of said float in said sight glass;
timing a period of time that the signal is transmitted, said step of timing comprising initiating said period of time when said float is sensed, said period of time being a period of time during which said float is sensed;
producing a humanly perceivable indication when said period of time is at a predetermined limit;
affixing a proximity switch to an exterior of said sight glass, said float having a length dimension; and
positioning said proximity switch such that said proximity switch is located a distance above a low level of said liquid in said sight glass generally equal to said length dimension of said float.

3. The method of claim 2, further comprising:
affixing a proximity switch to an exterior of said sight glass generally adjacent a high level of liquid in said sight glass, said proximity switch sensing the position of said float.

4. The method of claim 2, further comprising:
forming a float of a metallic material, said step of sensing comprising sensing a proximity of said metallic material in said sight glass.

5. The method of claim 2, said step of producing comprising:
illuminating a warning light when said level of liquid in said sight glass is at either a high level or at low level.

6. The method of claim 2, said step of connecting comprising:
forming said sight glass so as to have a horizontal portion and vertical portion and a 90° bend extending between said horizontal portion and said vertical portion, said 90° bend extending downwardly below said horizontal portion; and
connecting an end of horizontal portion opposite said 90° bend to said vessel generally adjacent a bottom end of said vessel.

* * * * *